(12) United States Patent
Ungureanu et al.

(10) Patent No.: US 12,548,209 B2
(45) Date of Patent: Feb. 10, 2026

(54) ADDING DIVERSITY TO GENERATED IMAGES

(71) Applicant: ADOBE INC., San Jose, CA (US)

(72) Inventors: Adrian-Stefan Ungureanu, Bucharest (RO); Vlad-Constantin Lungu-Stan, Bucharest (RO); Ionut Mironică, Bucharest (RO)

(73) Assignee: ADOBE INC., San Jose, CA (US)

( * ) Notice: Subject to any disclaimer, the term of this patent is extended or adjusted under 35 U.S.C. 154(b) by 159 days.

(21) Appl. No.: 18/491,472

(22) Filed: Oct. 20, 2023

(65) Prior Publication Data

US 2025/0131604 A1   Apr. 24, 2025

(51) Int. Cl.
*G06T 11/00* (2006.01)
*G06F 3/04845* (2022.01)
*G06F 3/04847* (2022.01)

(52) U.S. Cl.
CPC .......... *G06T 11/00* (2013.01); *G06F 3/04845* (2013.01); *G06F 3/04847* (2013.01); *G06T 2200/24* (2013.01)

(58) Field of Classification Search
CPC . G06T 11/00; G06T 2200/24; G06F 3/04845; G06F 3/04847
See application file for complete search history.

(56) References Cited

U.S. PATENT DOCUMENTS

2024/0161369 A1* 5/2024 Li .......................... G06T 11/60

OTHER PUBLICATIONS

Gal, Rinon, et al. "An image is worth one word: Personalizing text-to-image generation using textual inversion." arXiv preprint arXiv: 2208.01618 (Year: 2022).*
Federico Galatolo, Mario Cimino, Gigliola Vaglini. "Generating Images from Caption and Vice Versa via Clip-Guided Generative Latent Space Search" Proceedings of the International Conference on Image Processing and Vision Engineering (Year: 2021).*
"Midjourney-chaos Explained", published online at https://midlibrary.io/midguide/midjourney-ai-chaos-explained on Mar. 3, 2023, and archived at archive.org as of May 23, 2023 (Year: 2023).*
"Chaos", published as part of Midjourney Docs at https://docs.midjourney.com/docs/chaos, published at archive.org as of Jan. 30, 2023 (Year: 2023).*
1Ramesh, et al., "Hierarchical Text-Conditional Image Generation with Clip Latents", arXiv preprint arXiv:2204.06125v1 [cs.CV] Apr. 13, 2022, 27 pages.

(Continued)

*Primary Examiner* — William A Beutel
(74) *Attorney, Agent, or Firm* — F. CHAU & ASSOCIATES, LLC

(57) ABSTRACT

Embodiments include obtaining a prompt and a diversity input indicating a level of adherence to the prompt. The diversity input may be implemented as a graphical user interface (GUI) element, such as a slider or field. Embodiments then generate a guidance embedding based on the prompt and the diversity input. Embodiments update the guidance embedding based on the diversity input. Subsequently, embodiments generate a synthetic image based on the guidance embedding, wherein the synthetic image depicts an element of the prompt based on the level of adherence from the diversity input.

20 Claims, 10 Drawing Sheets

(56) References Cited

OTHER PUBLICATIONS

2Rombach, et al., "High-Resolution Image Synthesis with Latent Diffusion Models", arXiv preprint arXiv:2112.10752v2 [cs.CV] Apr. 13, 2022, 45 pages.
3Balaji, et al, "eDiff-I: Text-to-Image Diffusion Models with an Ensemble of Expert Denoisers", arXiv preprint arXiv:2211.01324v5 [cs.CV] Mar. 14, 2023, 24 pages.
4"Stable Diffusion Dynamic Prompts extension", found on the internet at: https://github.com/adieyal/sd-dynamic-prompts 2023, 31 pages.
5Radford, et al., "Learning Transferable Visual Models From Natural Language Supervision", arXiv preprint arXiv:2103.00020v1 [cs.CV] Feb. 26, 2021, 48 pages.
6Gatys, et al., "Image Style Transfer Using Convolutional Neural Networks", CVPR-Computer Vision Foundation, 2016, pp. 2414-2423.

\* cited by examiner

ADDING DIVERSITY TO GENERATED IMAGES

BACKGROUND

The following relates generally to image processing, and more specifically to image generation. Image processing is a type of data processing that involves the manipulation of an image to get the desired output, typically utilizing specialized algorithms and techniques. It is a method used to perform operations on an image to enhance its quality or to extract useful information from it. This process usually comprises a series of steps that includes the importation of the image, its analysis, manipulation to enhance features or remove noise, and the eventual output of the enhanced image or salient information it contains.

Image processing techniques are also used for image generation. For example, machine learning (ML) techniques have been applied to create generative models that can produce new image content. One use for generative AI is to create images based on an input prompt. This task is often referred to as a "text to image" task or simply "text2img". ML models including Generative Adversarial Networks (GANs) and Variational Autoencoders (VAEs) have been adapted to generate pixel data to create novel images. Newer approaches such as denoising diffusion probabilistic models (DDPMs) can iteratively refine generated images based on guidance, such as a text prompt. Some models are further configured to produce generate images that are easily converted to vector format images.

SUMMARY

Systems and methods for adding diversity to generated images are described. In some cases, the level of diversity expressed in a synthetic image can be limited by the guidance provided from a user, such as a sparse text prompt or image prompt. Embodiments include an image generation apparatus with an image generation model configured to generate synthetic images based on both an input prompt and a diversity input. A prompt encoder encodes the prompt to generate a prompt embedding, and the system adjusts the prompt embedding based on the diversity parameter. According to some aspects, the system generates an expanded prompt using a language generation model that takes the prompt as input. Then, the system interpolates between an embedding of the expanded prompt and the prompt embedding based on the diversity parameter. In some examples, the system adjusts the prompt embedding by combining the prompt embedding with a noise tensor, where the amount of noise added to the prompt embedding is based on the diversity parameter.

A method, apparatus, non-transitory computer readable medium, and system for image generation are described. One or more aspects of the method, apparatus, non-transitory computer readable medium, and system include obtaining a prompt and a diversity input indicating a level of adherence to the prompt; generating a guidance embedding based on the prompt and the diversity input; and generating, using an image generation model, a synthetic image based on the guidance embedding, wherein the synthetic image depicts an element of the prompt based on the level of adherence from the diversity input.

A non-transitory computer-readable medium storing code for image generation are described. One or more aspects of the non-transitory computer-readable medium include code that is executable by a processor to obtain a prompt and a diversity input indicating a level of adherence to the prompt; generate a guidance embedding based on the prompt and the diversity input; and generate, using an image generation model a synthetic image based on the guidance embedding, wherein the synthetic image depicts an element of the prompt based on the level of adherence from the diversity input.

An apparatus, system, and method for image generation are described. One or more aspects of the apparatus, system, and method include at least one processor; at least one memory storing instructions executable by the at least one processor; and an image generation model comprising parameters stored in the at least one memory and configured to generate a synthetic image based on a guidance embedding, wherein the guidance embedding is generated based on a prompt and a diversity input indicating a level of adherence to the prompt, and wherein the synthetic image depicts an element of the prompt based on the level of adherence from the diversity input.

DETAILED DESCRIPTION

Figure 1:
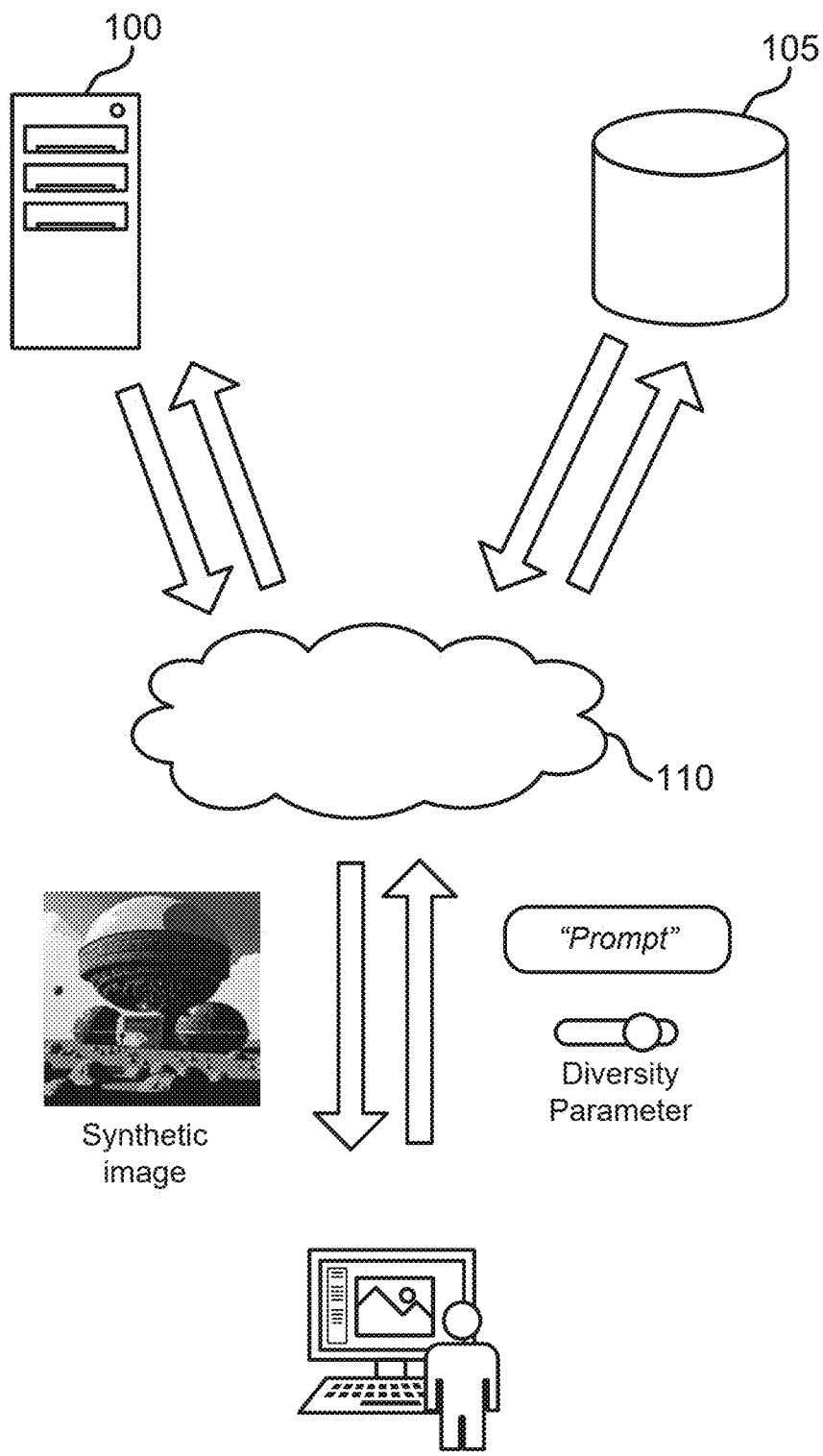
FIG. 1 shows an example of an image generation system according to aspects of the present disclosure.

Image processing is an intricate facet of computer vision and graphics and has undergone significant advancements with the creation of advanced algorithms and computational techniques. Image processing encompasses image generation, in which systems synthesize visual representations based on a set of given inputs. Diffusion models, in particular, have reshaped the generative pipelines, by enabling the production of remarkably detailed and nuanced images from diverse inputs.

However, with these advancements comes a challenge related to the user's role in the generative process. The effectiveness of these models can hinge on the user's ability to provide descriptive inputs. For example, in some cases, images generated by professionals who are familiar with the tools often have different characteristics than those produced by less experienced users. This variation can be attributed to the difference in familiarity and expertise with the generative tools.

In some cases, creators attempt to increase the diversity of generated outputs using prompt-expansion or diversification using language models (LMs). However, off-the-shelf language models are not trained for this task of diversification. Furthermore, using the prompts produced by an LM does not allow for an intermediary prompt embedding between the prompt embedding and some expanded prompt embedding.

Other methods include strategy altering the stochastic elements of the diffusion process. This can be accomplished by modifying the sampler type or introducing noise variations. While this method can introduce diversity for consistent parameters (such as the input prompt or seed), it is computationally impractical to maintain and manage multiple instances of the same generative model with varied samplers.

Embodiments of the disclosure provide an improved image generation platform that enables users to select the level of diversity in generated images. Selecting the diversity level provides faster and more accurate results than conventional image generation platforms by reducing or eliminating the need for users to iteratively adjust their prompts to achieve their desired output. For example, embodiments include receiving a diversity parameter input from a user, and applying a diversity parameter to a prompt embedding. For example, the diversity parameter can be used to interpolate between a prompt and an expanded prompt, to determine noise added to the prompt embedding, or both. If the diversity parameter is set to a low value, a small amount of diversity is added to the prompt embedding and generated images will be similar to each other. If the diversity parameter is larger, modifications to the prompt embedding will be more substantial and the resulting images will be more diverse.

The diversity parameter may also be referred to as a "dream parameter", as the variations in the synthetic images can reflect the variance experienced in dreams. In some cases, the diversity parameter represents an amount of adherence to the original prompt. For example, a higher diversity parameter can indicate a looser adherence to the input prompt.

In some examples, embodiments implement the diversity parameter by interpolating between a prompt embedding and an expanded prompt embedding based on the diversity parameter. In some cases, embodiments generate a noise tensor, and combine the prompt embedding with the noise tensor according to the diversity parameter to move the prompt embedding to another location in an embedding space.

An image generation system is described with reference to FIGS. 1-7. Methods for increasing diversity in generated images are described with reference to FIGS. 8-9. A computing device configured to implement an image generation apparatus is described with reference to FIG. 10.

Image Generation System

An apparatus for image generation is described. One or more aspects of the apparatus include at least one processor; at least one memory storing instructions executable by the at least one processor; and an image generation model comprising parameters stored in the at least one memory and configured to generate a synthetic image based on a guidance embedding, wherein the guidance embedding is generated based on a prompt and a diversity input indicating a level of adherence to the prompt, and wherein the synthetic image depicts an element of the prompt based on the level of adherence from the diversity input.

Some examples of the apparatus, system, and method further include a language generation model configured to generate an expanded prompt based on the prompt. Some examples further include a prompt encoder configured to embed the prompt to obtain a prompt embedding. Some examples further include a noise component configured to generate a noise tensor. Some examples of the apparatus, system, and method further include a user interface configured to display a diversity input element and to obtain the diversity input from a user via the diversity input element.

FIG. 1 shows an example of an image generation system according to aspects of the present disclosure. The example shown includes image generation apparatus 100, database 105, network 110, and user interface 115. Image generation apparatus 100 is an example of, or includes aspects of, the corresponding element described with reference to FIG. 2.

In one example a user provides an input prompt via user interface 115. The input prompt may be an image, or a textual description of an image the user wishes to generate. The user further indicates a value for a diversity parameter, which represents a level of adherence to the input prompt. For example, the user may operate a slider element as part of a graphical user interface (GUI). Then, an image generation apparatus 100 processes the input prompt and the diversity parameter to generate a synthetic image, where the synthetic image depicts an element of the prompt based on the level of adherence from the diversity input.

One or more components of image generation apparatus 100 can be implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Database 105 stores information used by the image processing system. For example, the database may store previous prompts, previously generated images, machine learning model parameters, training data, user configuration settings, and the like. A database 105 is an organized collection of data. For example, a database 105 stores data in a specified format known as a schema. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with a database controller. In other cases, a database controller may operate automatically without user interaction.

Network 110 facilitates the transfer of information between image generation apparatus 100, database 105, and a user, e.g., via user interface 115. In some cases, a network is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User interface 115 enables a user to interact with a device. In some embodiments, the user interface 115 may include an audio device, such as an external speaker system, an external display device such as a display screen, or an input device (e.g., a remote-control device interfaced with the user interface directly or through an IO controller module). In some cases, a user interface 115 may be a graphical user interface (GUI). For example, the GUI may be a part of a web application, or a part of a program such as a multilayer design document editing software. According to some aspects, user interface 115 is configured to display a diversity input element, and to obtain the diversity input from a user via the diversity input element. User interface 115 is an example of, or includes aspects of, the corresponding element described with reference to FIG. 2.

Figure 2:
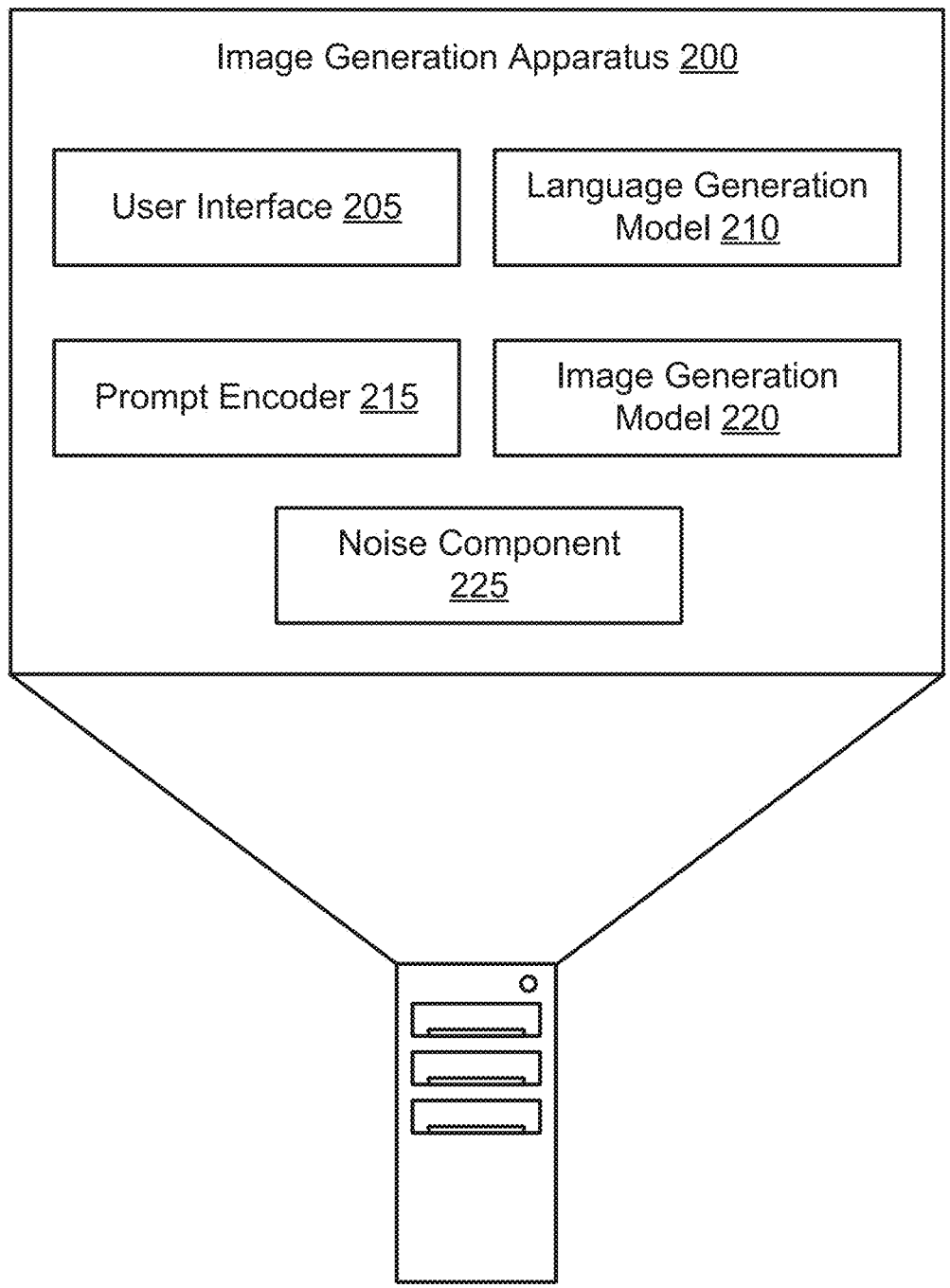
FIG. 2 shows an example of an image generation apparatus according to aspects of the present disclosure.

FIG. 2 shows an example of an image generation apparatus 200 according to aspects of the present disclosure. The example shown includes image generation apparatus 200, user interface 205, language generation model 210, prompt encoder 215, image generation model 220, and noise component 225.

Embodiments of image generation apparatus 200 include component parts which may further be divided into sub-components. These components are variously named and are described so as to partition the functionality enabled by the processor(s) and the executable instructions included in the computing device used in image generation apparatus 200 (such as the computing device described with reference to FIG. 10). In some examples, the partitions are implemented physically, such as through the use of separate circuits or processors for each component. In some examples, the partitions are implemented logically via the architecture of the code executable by the processors.

User interface 205 enables a user to interact with image generation apparatus 200. As described with reference to FIG. 1, embodiments of user interface 205 include a diversity input element, such as a slider, which is adjustable by a user. Embodiments are not limited thereto, however, and the diversity input element may include a text field, for example.

Some components of image generation apparatus 200, such as language generation model 210, prompt encoder 215, and image generation model 220 include an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Language generation model 210 is configured to produce a natural language response from an input prompt. In some embodiments, language generation model 210 produces an expanded prompt from the input prompt. For example, from an input prompt of "a butterfly", language generation model 210 might generate "a butterfly in a lush garden." Generally, including more detail in a prompt will increase the quality of synthesized images, because the network (e.g., image generation model 220) is better guided to a particular point in the embedding space, rather than dealing with uncertainty.

Embodiments of language generation model 210 include a transformer network. A transformer or transformer network is a type of neural network model used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes an attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence as Q. However, for the attention module that is taking into account the encoder and the decoder sequences, V is different from the sequence represented by Q. In some cases, values in V are multiplied and summed with some attention-weights a.

Contrastive Language-Image Pre-Training (CLIP) is a neural network that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations. Embodiments of language generation model 205 include a Generative Pretrained Transformer model, e.g., GPT-2, which is trained to complete sentences. Language generation model 210 is an example of, or includes aspects of, the corresponding element described with reference to FIGS. 3 and 4.

Prompt encoder 215 generates a guidance embedding for use by image generation model 220 based on the prompt and the diversity input. Embodiments of prompt encoder 215 include a text encoder such as Flan-T5, which is a transformer-based encoder, and may further include an image encoder such as the CLIP image encoder. Prompt encoder 215 processes the prompt to produce a guidance embedding vector in an embedding space, which captures information from the prompt. In some examples, prompt encoder 215 embeds the prompt and the expanded prompt to obtain a prompt embedding and an expanded prompt embedding. In some examples, prompt encoder 215 generates the guidance embedding by selecting an embedding located between the prompt embedding and the expanded prompt embedding based on the diversity input. In some examples, prompt encoder 215 generates a set of guidance embeddings based on the prompt, and the set of guidance embeddings are used to generate a plurality of synthetic images. Prompt encoder 215 is an example of, or includes aspects of, the corresponding element described with reference to FIGS. 3 and 5.

Image generation model is configured to generate synthetic images. According to some aspects, image generation model 220 generates a synthetic image based on the guidance embedding, where the synthetic image depicts an element of the prompt based on the level of adherence from the diversity input. Image generation model 220 is an example of, or includes aspects of, the corresponding element described with reference to FIG. 3. Embodiments of image generation model 220 include a diffusion model such as the one described with reference to FIG. 7. However, embodiments are not limited to diffusion models, and can include any generative model that is configured to generate synthetic images based on guidance features.

Noise component 225 is configured to generate noise data, such a noise tensor. Embodiments of noise 225 sample from a distribution such as a Gaussian distribution to create the noise tensor. In some examples, noise component 225 combines the noise tensor and the prompt embedding based on the diversity input to obtain the guidance embedding. Noise component 225 is an example of, or includes aspects of, the corresponding element described with reference to FIG. 3. Additional detail regarding a noise injection process is provided with reference to FIG. 6.

Figure 3:
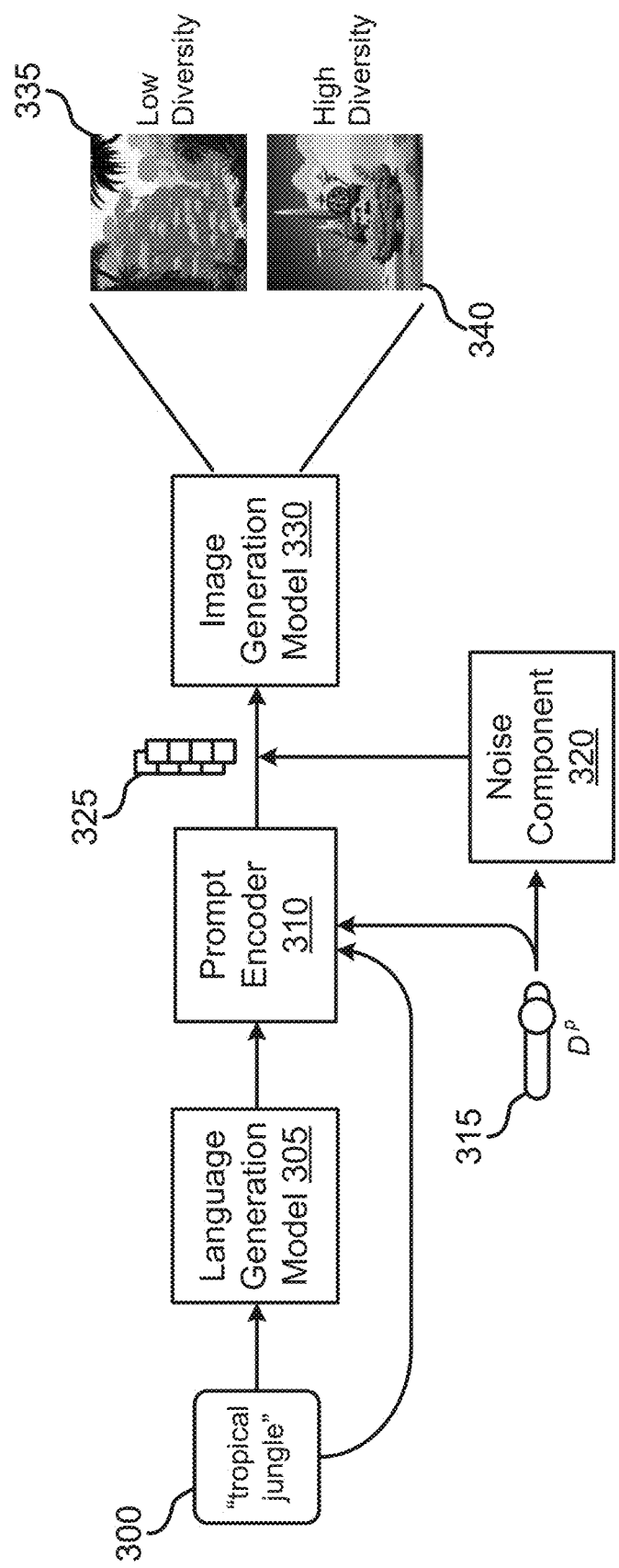
FIG. 3 shows an example of a pipeline for generating synthetic images with increased diversity according to aspects of the present disclosure.

FIG. 3 shows an example of a pipeline for generating synthetic images with increased diversity according to aspects of the present disclosure. The example shown includes prompt 300, language generation model 305, prompt encoder 310, diversity input 315, noise component 320, guidance features 325, image generation model 330, synthetic image with low diversity 335, and synthetic image with high diversity 340.

Language generation model 305 is an example of, or includes aspects of, the corresponding element described with reference to FIGS. 2 and 4. Prompt encoder 310 is an example of, or includes aspects of, the corresponding element described with reference to FIGS. 2 and 5. Noise component 320 and image generation model 330 are examples of, or include aspects of, the corresponding elements described with reference to FIG. 2. Guidance features 325 is an example of, or includes aspects of, the corresponding element described with reference to FIG. 7.

In this example, a user provides prompt 300 and diversity input 315 via a user interface, such as the ones described with reference to FIGS. 2-3. Then, language generation model 305 creates an expanded prompt based on prompt 300, and both prompt 300 and the expanded prompt are input to prompt encoder 310, which generates a prompt embedding and an expanded prompt embedding therefrom. In some cases, prompt encoder 310 interpolates between the prompt embedding and the expanded prompt embedding based on the diversity input 315 to generate an interpolated embedding. For instance, given a high diversity input (e.g., a 1.0 on a scale from 0 to 1.0), the interpolated embedding might be, or closely resemble, the expanded prompt embedding. Conversely, with a lower diversity input, the interpolated embedding might be, or closely resemble, the prompt embedding.

In some cases, noise component 320 injects noise to the interpolated embedding. At least one embodiment, only one of the noise injections and the embedding interpolation is performed. According to some aspects, noise component 320 samples a noise tensor from a distribution such as a Gaussian distribution. Then, noise component 320 combines the noise tensor with the interpolated embedding. For example, noise component 320 may add the noise tensor to the interpolated embedding, where the noise tensor is scaled by the diversity input 315. This process adjusts the interpolated embedding to produce guidance features 325.

Then, guidance features 325 are input to image generation model 330 to generate an output image. The output image deviates from the input prompt based on the diversity input 315. For example, the output image may include objects, styles, backgrounds, or other elements not originally included in prompt 300, as well as elements from prompt 300. In some cases, a user provides a low value for diversity input 315, and image generation model 330 generates synthetic image with low diversity 335 therefrom. In some cases, the user provides a high value for diversity input 315, and image generation model 330 generates synthetic image with high diversity 340 therefrom.

Figure 4:
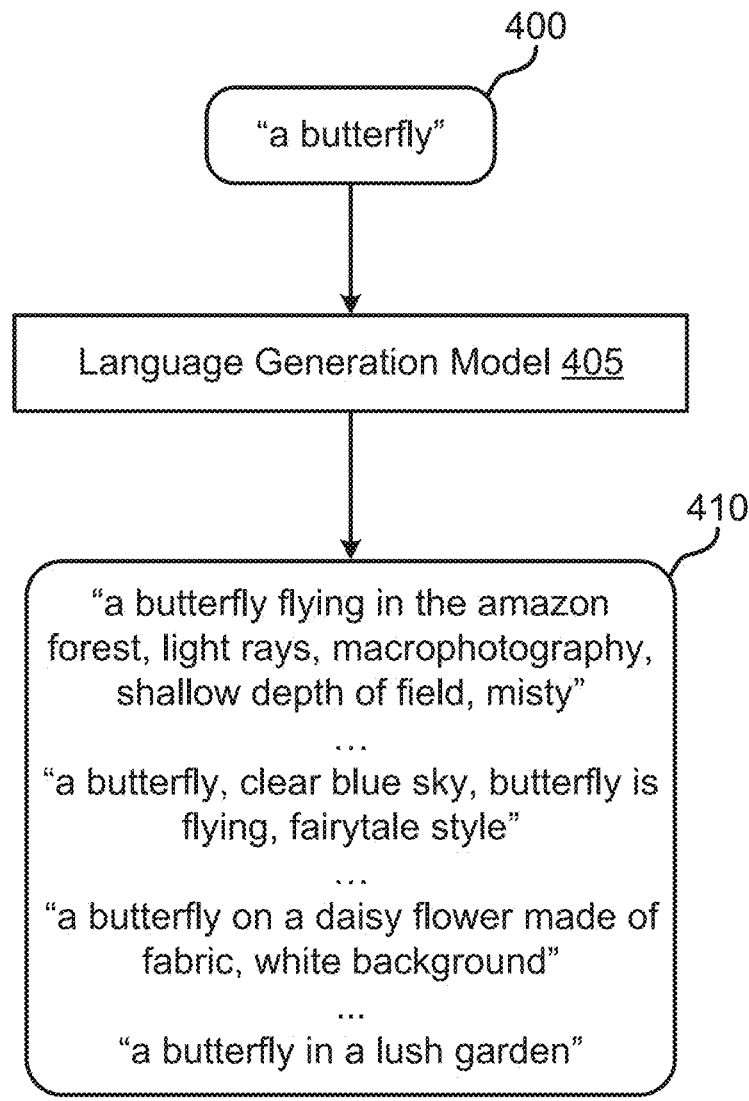
FIG. 4 shows an example of prompt expansion according to aspects of the present disclosure.

FIG. 4 shows an example of prompt expansion according to aspects of the present disclosure. The example shown includes initial prompt 400, language generation model 405, and expanded prompts 410. Language generation model 405 is an example of, or includes aspects of, the corresponding element described with reference to FIGS. 2 and 3.

In an example, language generation model 405 processes initial prompt 400 to expand it into one or more expanded prompts 410. The expanded prompts 410 include additional details which are related to the content from initial prompt 400. For example, if initial prompt 400 mentions "butterfly", the expanded prompts 410 may include additional details related to "butterfly", such as "light raise, clear blue sky, lush background". According to some aspects, only one of the expanded prompts 410 is selected for embedding. The selection may be made randomly, or another model may compute a semantic similarity between each of the expanded prompts 410 and initial prompt 400 and choose the expanded prompt that is the most semantically similar to initial prompt 400.

Figure 5:
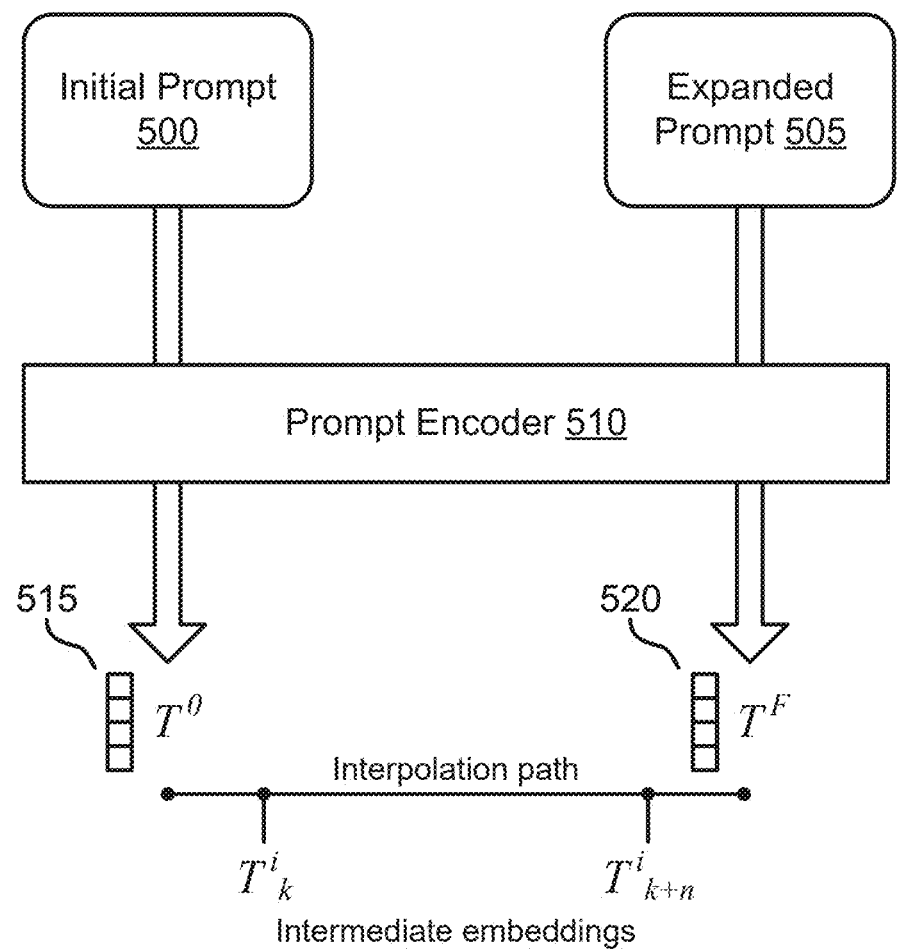
FIG. 5 shows an example of prompt embedding interpolation according to aspects of the present disclosure.

FIG. 5 shows an example of prompt embedding interpolation according to aspects of the present disclosure. The example shown includes initial prompt 500, expanded prompt 505, prompt encoder 510, initial prompt embedding 515, and expanded prompt embedding 520. Prompt encoder 510 is an example of, or includes aspects of, the corresponding element described with reference to FIGS. 2 and 3.

In this example, a prompt encoder 510 encodes initial prompt 500 and expanded prompt 505 to generate initial prompt embedding 515 and expanded prompt embedding 520, respectively. Embodiments of prompt encoder 510 include a text encoder such as Flan-T5 or the CLIP text encoder or may further include an image encoder such as the CLIP image encoder. Accordingly, the initial prompt 500 may be either a text or an image. If initial prompt 500 is an image, a language generation model may evaluate the image to produce a description of the image, and then expand that description to include additional terms related to the description, where the expanded description is used as expanded prompt 505. After generating initial prompt embedding 515 and expanded prompt embedding 520, prompt encoder 510 interpolates between the two embeddings to obtain an intermediary embedding, where the interpolation is based on a diversity input as described with reference to FIG. 3.

Figure 6:
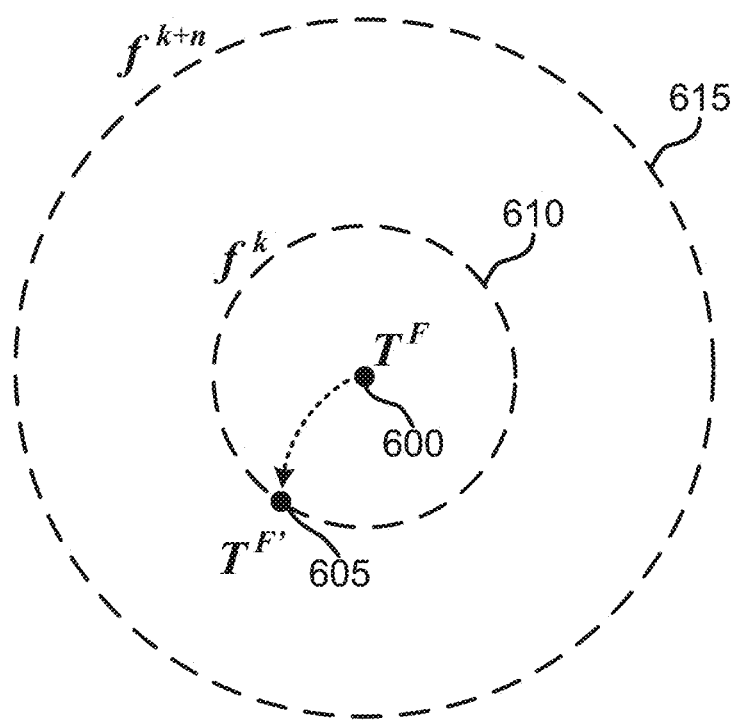
FIG. 6 shows an example of noise injection according to aspects of the present disclosure.

FIG. 6 shows an example of noise injection according to aspects of the present disclosure. The example shown includes prompt embedding 600, updated prompt embedding 605, first distribution 610, and second distribution 615.

According to some aspects, the embedding space of the prompt encoder is a discrete space. Accordingly, a slight change to an embedding in the space will result in changes to the generated images. FIG. 6 represents the embedding space as a 2D representation. Prompt embedding 600 is a point in the embedding space and may be denoted as $T^F$. Embodiments are configured to adjust $T^F$ according to a diversity input such as the one described with reference to FIG. 3. The diversity input, also referred to as a diversity parameter, may be denoted as $D^P$. In this example, embodiments adjust $T^F$ by adding a noise tensor to $T^F$, scaled by $D^P$. This process can be described by the following:

$$T^{F\prime} = T^F \times D^P + T^{noise} \times (1 - D^P) \qquad (1)$$

where $T^{F\prime}$ is the output embedding (i.e., updated prompt embedding 605), and $T^{noise}$ is the noise tensor. According to some aspects, $T^{noise}$ is sampled from, e.g., a Gaussian distribution. For example, first distribution 610 represents a set of points distributed $T^F$ around according to a first Gaussian distribution. Second distribution 615 similarly represents a set of points distributed around $T^F$, but instead according to a second Gaussian distribution that has a standard deviation greater than that of the first gaussian distribution. In some cases, rather than modulating the blending of the noise tensor according to $D^P$, $D^P$ determines parameters of the sampling distribution. In some cases, a combination of these influences is used.

Figure 7:
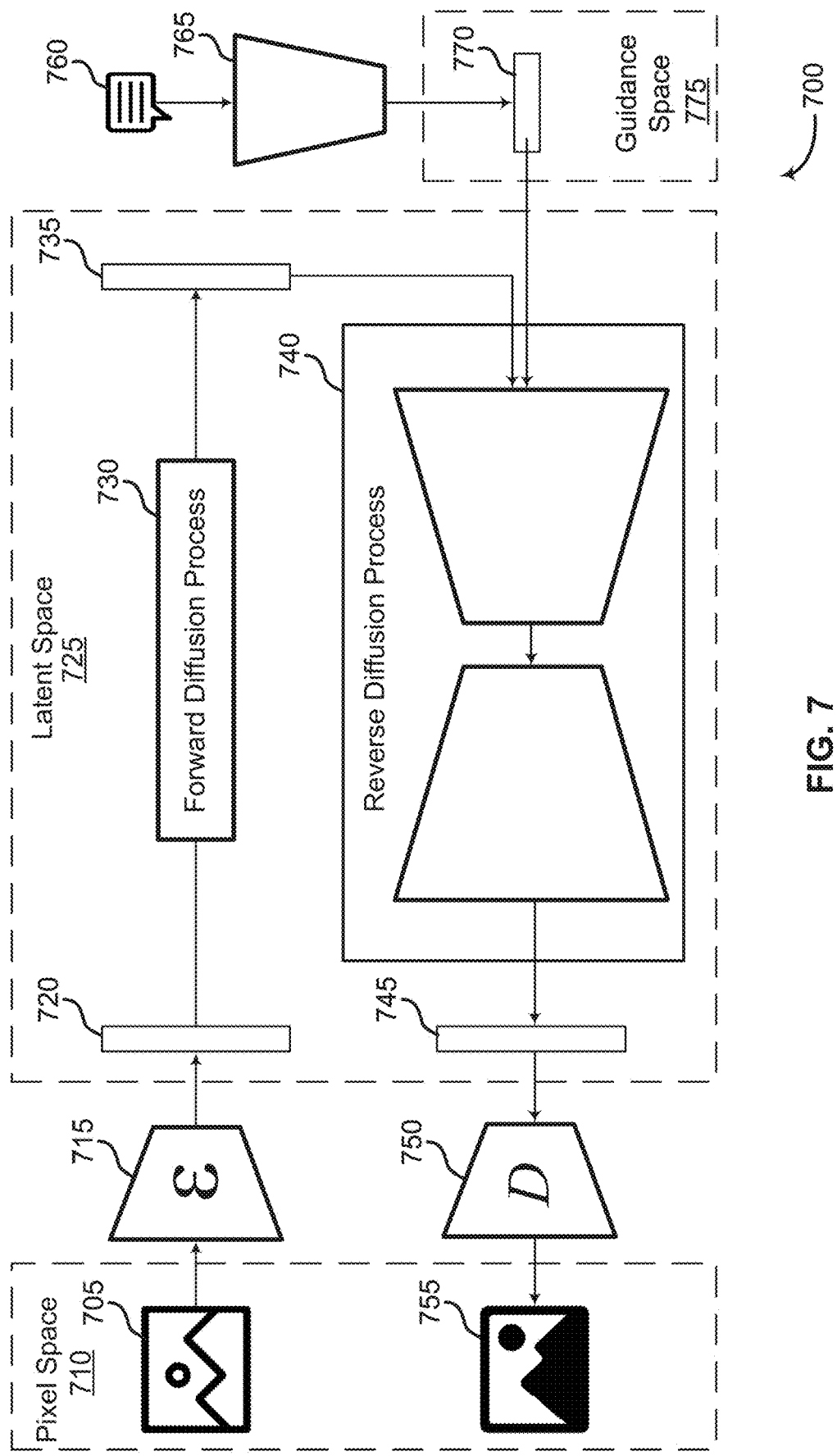
FIG. 7 shows an example of an image generation model according to aspects of the present disclosure.

FIG. 7 shows an example of an image generation model according to aspects of the present disclosure. The example shown includes guided latent diffusion model 700, original image 705, pixel space 710, image encoder 715, original image features 720, latent space 725, forward diffusion process 730, noisy features 735, reverse diffusion process 740, denoised image features 745, image decoder 750, output image 755, text prompt 760, text encoder 765, guidance features 770, and guidance space 775. Guidance features 770 is an example of, or includes aspects of, the corresponding element described with reference to FIG. 3.

In this example, the image generation model is a diffusion model, and particularly, a guided latent diffusion model, some examples, diffusion models are based on a neural network architecture known as a U-Net. The U-Net takes input features having an initial resolution and an initial number of channels and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. That is, the down-sampled features are up-sampled using up-sampling process to obtain up-sampled features. The up-sampled features can be combined with intermediate features having the same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t|x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process, the model begins with noisy data $x_T$, such as a noisy image and denoises the data to obtain the $p(x_{t-1}|x_t)$. At each step t−1, the reverse diffusion process takes $x_t$, such as first intermediate image, and t as input. Here, t represents a step in the sequence of transitions associated with different noise levels. The reverse diffusion process outputs $x_{t-1}$, such as second intermediate image iteratively until $x_T$ is reverted back to $x_0$, the original image. The reverse process can be represented as:

$$p_\theta(x_{t-1} \mid x_t) := N\Big(x_{t-1}; \mu_\theta(x_t, t), \sum_\theta(x_t, t)\Big). \quad (2)$$

The joint probability of a sequence of samples in the Markov chain can be written as a product of conditionals and the marginal probability:

$$x_T: p_\theta(x_{0:T}) := p(x_T)\prod_{t=1}^{T} p_\theta(x_{t-1} \mid x_t) \quad (3)$$

where $p(x_T)=N(x_T; 0,1)$ is the pure noise distribution as the reverse process takes the outcome of the forward process, a sample of pure noise, as input and $\Pi_{t=1}^{T} p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input and a generated data z is mapped back into the pixel space from the latent space as output. In some examples, $x_0$ represents an original input image with low image quality, latent variables $x_1, \ldots, x_T$ represent noisy images, and x̃ represents the generated image with high image quality.

A diffusion model may be trained using both a forward and a reverse diffusion process. In one example, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

The system then adds noise to a training image using a forward diffusion process in N stages. In some cases, the forward diffusion process is a fixed process where Gaussian noise is successively added to an image. In latent diffusion models, the Gaussian noise may be successively added to features in a latent space.

At each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

The training system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data.

The training system then updates parameters of the model based on the comparison. For example, parameters of a U-Net may be updated using gradient descent. Time-dependent parameters of the Gaussian transitions can also be learned.

Image Generation

A method for image generation is described. One or more aspects of the method include obtaining a prompt and a diversity input indicating a level of adherence to the prompt; generating a guidance embedding based on the prompt and the diversity input; and generating, using an image generation model, a synthetic image based on the guidance embedding, wherein the synthetic image depicts an element of the prompt based on the level of adherence from the diversity input.

Some examples of the method, apparatus, non-transitory computer readable medium, and system further include generating an expanded prompt based on the prompt. Some examples further include embedding the prompt and the expanded prompt to obtain a prompt embedding and an expanded prompt embedding. Some examples further include generating the guidance embedding by selecting an embedding located between the prompt embedding and the expanded prompt embedding based on the diversity input. In some aspects, the expanded prompt is generated by a language generation model.

Some examples of the method, apparatus, non-transitory computer readable medium, and system further include obtaining a noise tensor. Some examples further include embedding the prompt to obtain a prompt embedding. Some examples further include combining the noise tensor and the prompt embedding based on the diversity input to obtain the guidance embedding.

In some aspects, the prompt comprises a text prompt, and the guidance embedding comprises a text embedding. In some aspects, the prompt comprises an image prompt, and the guidance embedding comprises an image embedding. In some aspects, the prompt comprises a text prompt, and the guidance embedding comprises an image embedding generated by a prior model based on the text prompt.

Some examples of the method, apparatus, non-transitory computer readable medium, and system further include generating a plurality of guidance embeddings based on the prompt. Some examples further include generating a plurality of synthetic images based on the plurality of guidance embeddings, respectively. Some examples of the method, apparatus, non-transitory computer readable medium, and system further include providing a diversity input element. Some examples further include receiving the diversity input from a user via the diversity input element.

Figure 8:
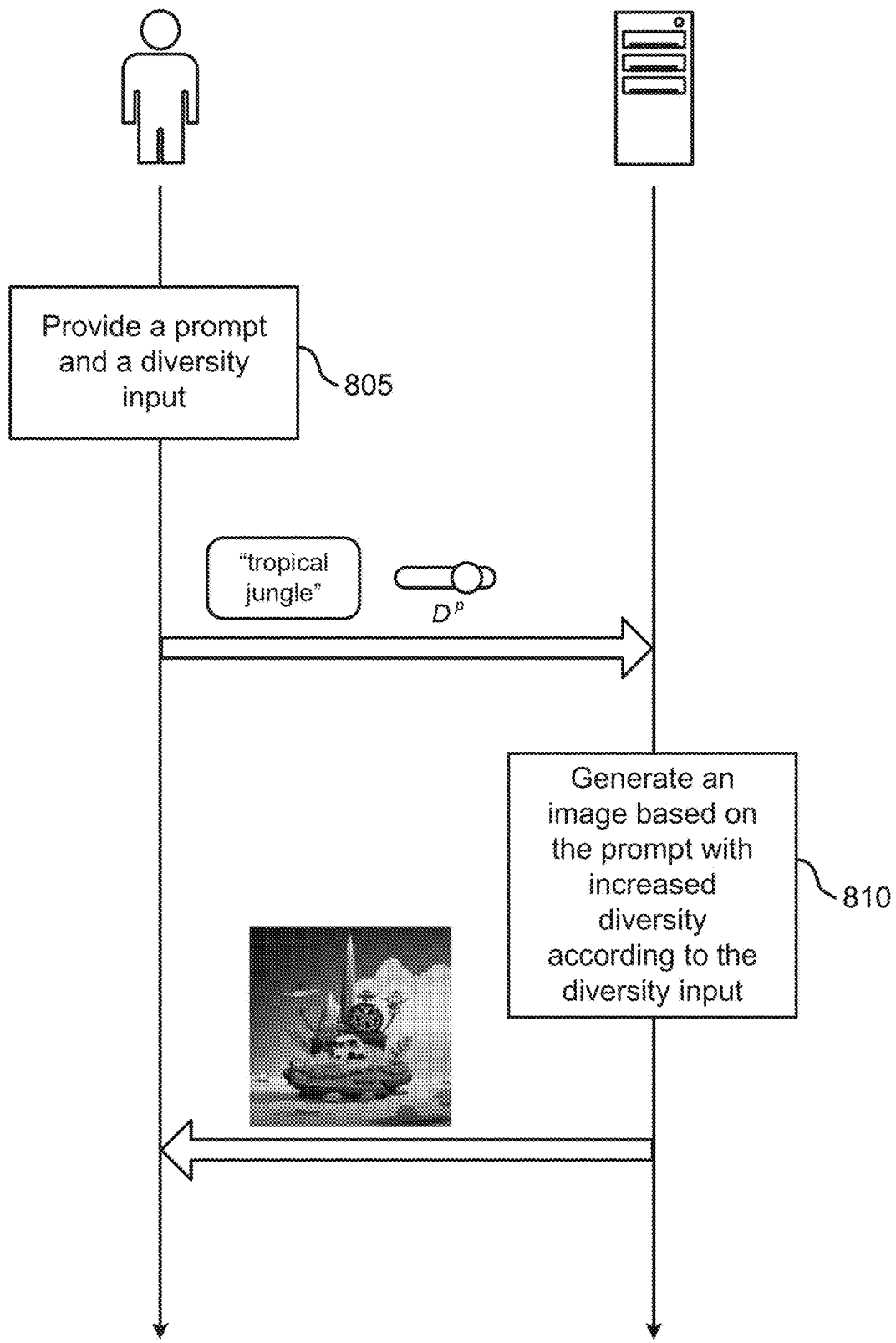
FIG. 8 shows an example of a method for providing a user with a synthetic image with increased diversity according to aspects of the present disclosure.

FIG. 8 shows an example of a method 800 for providing a user with a synthetic image with increased diversity according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, a user provides a prompt and a diversity input. The prompt may be, for example, a text prompt or an image prompt. The user may provide the prompt and the diversity input via a user interface, such as the ones described with reference to FIGS. 1-2.

At operation 810, the system generates an image based on prompt with increased diversity based on diversity input. In an example, a language generation model expands the prompt, and prompt encoder encodes the prompt and the expanded prompt to generate a prompt embedding and an expanded prompt embedding. Then, the prompt encoder obtains an intermediary embedding by interpolating between the prompt embedding and the expanded prompt embedding, where the amount of interpolation is determined based on the diversity input. In some cases, noise is injected to this resultant embedding to generate guidance features, where the amount of noise is also determined based on the diversity input. Then, an image generation model generates a synthetic image based on the guidance features. In this way, the system generates the image with an amount of diversity that is modulated by the diversity input.

Figure 9:
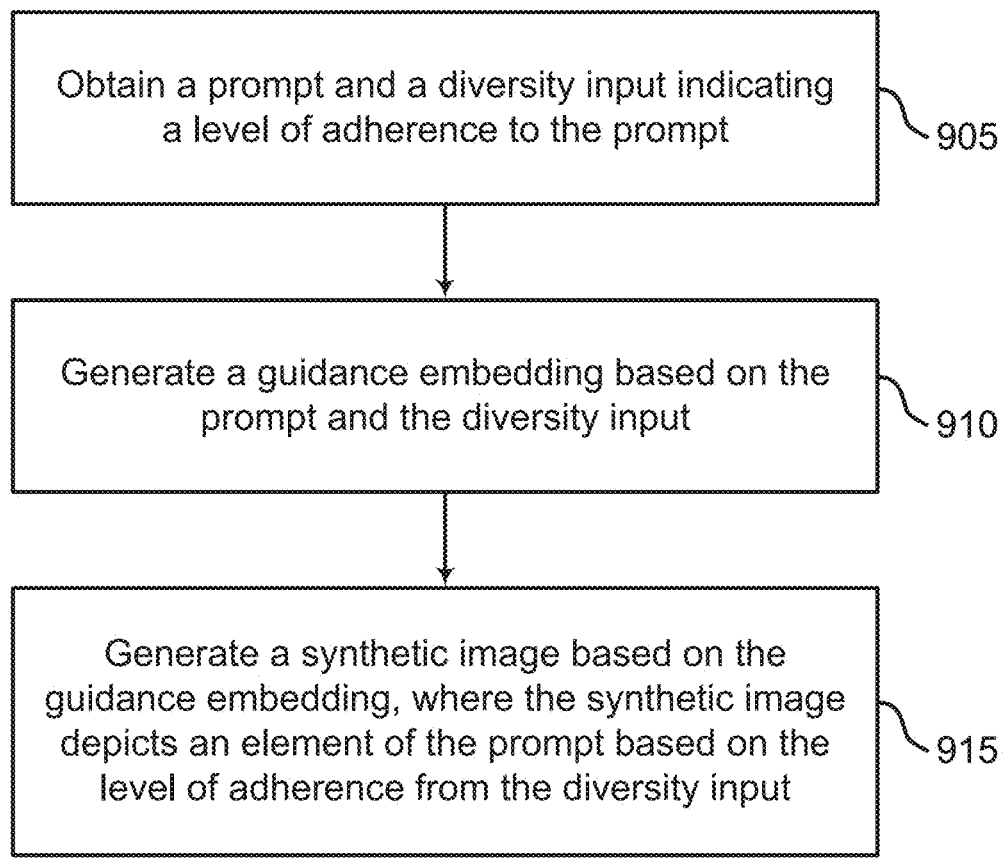
FIG. 9 shows an example of a method for generating a synthetic image according to aspects of the present disclosure.

FIG. 9 shows an example of a method 900 for generating a synthetic image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains a prompt and a diversity input indicating a level of adherence to the prompt. In some cases, the operations of this step refer to, or may be performed by, an image generation apparatus as described with reference to FIGS. 1 and 2. A user may provide the prompt and the diversity input via a user interface.

At operation 910, the system generates a guidance embedding based on the prompt and the diversity input. In some cases, the operations of this step refer to, or may be performed by, a prompt encoder as described with reference to FIGS. 2, 3, and 5. In some cases, the system additionally generates an expanded prompt, and an expanded prompt guidance embedding based on the expanded prompt.

At operation 915, the system generates, using an image generation model, a synthetic image based on the guidance embedding, where the synthetic image depicts an element of the prompt based on the level of adherence from the diversity input. In some cases, the operations of this step refer to, or may be performed by, an image generation model as described with reference to FIGS. 2 and 3. For example, the system may adjust the guidance embedding using embedding interpolation and/or noise injection, where the amount of embedding interpolation or noise injection is determined based on the diversity input. Additional detail regarding the generation process is provided with reference to FIG. 7.

Figure 10:
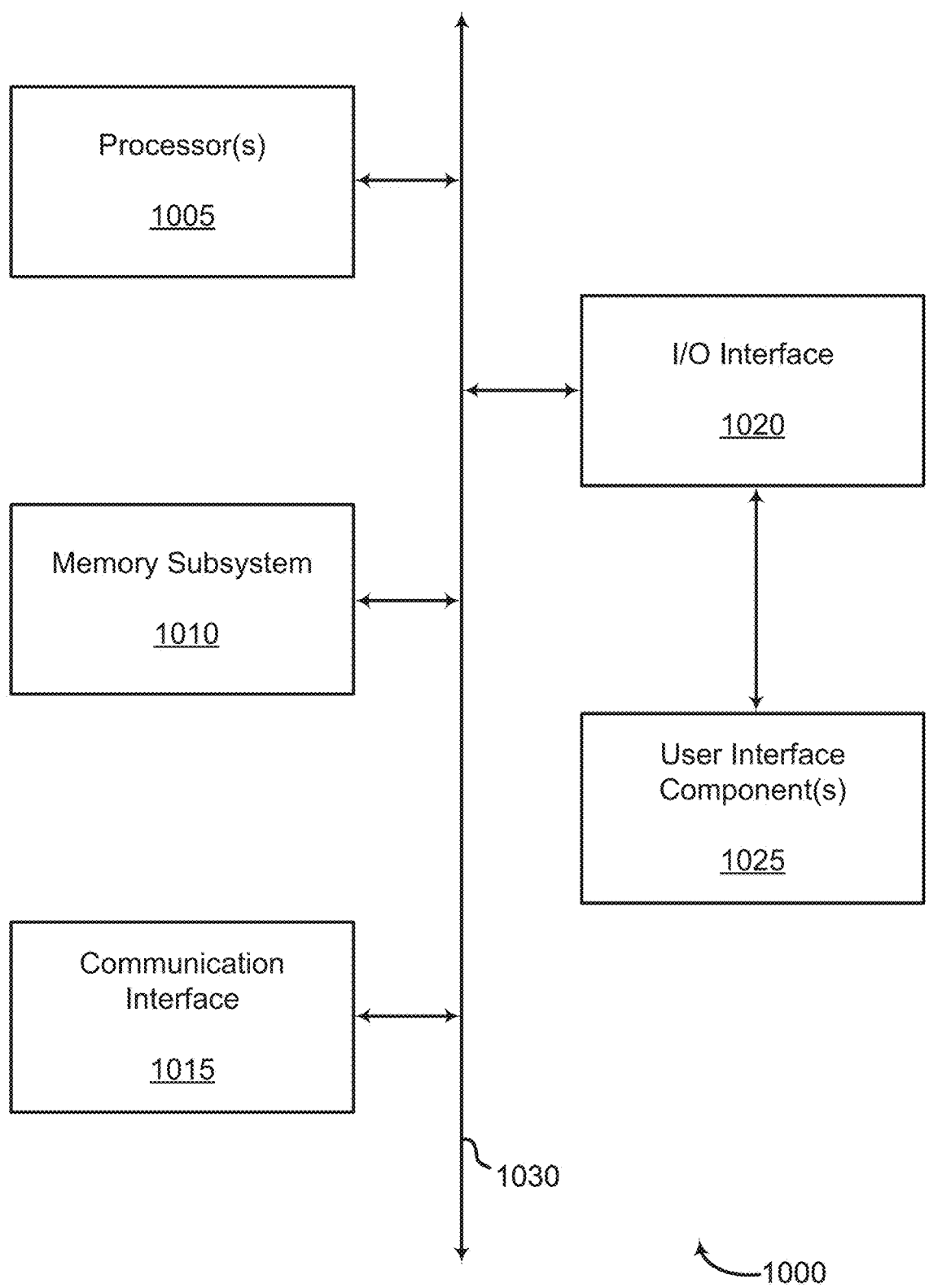
FIG. 10 shows an example of a computing device according to aspects of the present disclosure.

FIG. 10 shows an example of a computing device 1000 according to aspects of the present disclosure. The example shown includes computing device 1000, processor(s) 1005, memory subsystem 1010, communication interface 1015, I/O interface 1020, user interface component(s) 1025, and channel 1030.

In some embodiments, computing device 1000 is an example of, or includes aspects of, image generation apparatus 100 of FIG. 1. In some embodiments, computing device 1000 includes one or more processors 1005 that can execute instructions stored in memory subsystem 1010 to obtain a prompt and a diversity input indicating a level of adherence to the prompt; generate a guidance embedding based on the prompt and the diversity input; and generate, using an image generation model, a synthetic image based on the guidance embedding, wherein the synthetic image depicts an element of the prompt based on the level of adherence from the diversity input.

According to some aspects, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enables a user to interact with computing device 1000. In some cases, user interface component(s) 1025 include an audio device, such as an external speaker system, an external display device such as a display screen, an input device (e.g., a remote-control device interfaced with a user interface directly or through the I/O controller), or a combination thereof. In some cases, user interface component(s) 1025 includes a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining a prompt and a diversity input indicating a level of adherence to the prompt;
   generating an expanded prompt based on the prompt;
   embedding the prompt and the expanded prompt to obtain a prompt embedding and an expanded prompt embedding, respectively;
   generating a guidance embedding based on the prompt embedding, the expanded prompt embedding, and the diversity input by interpolating between the prompt embedding and the expanded prompt embedding; and
   generating, using an image generation model, a synthetic image based on the guidance embedding, wherein the synthetic image depicts an element of the prompt based on the level of adherence from the diversity input.

2. The method of claim 1, wherein
   when the diversity input is higher, the guidance embedding closely resembles the expanded prompt embedding, and when the diversity input is lower, the guidance embedding closely resembles the prompt embedding.

3. The method of claim 1, wherein:
   the expanded prompt is generated by a language generation model.

4. The method of claim 1, wherein generating the guidance embedding comprises:
   obtaining a noise tensor;
   embedding the prompt to obtain a prompt embedding; and
   combining the noise tensor and the prompt embedding based on the diversity input to obtain the guidance embedding.

5. The method of claim 1, wherein generating the guidance embedding comprises:
   encoding a text from the prompt to generate a text embedding, wherein the guidance embedding comprises the text embedding.

6. The method of claim 1, wherein generating the guidance embedding comprises:
   encoding an image from the prompt to generate an image embedding, wherein the guidance embedding comprises the image embedding.

7. The method of claim 1, wherein generating the guidance embedding comprises:
   generating an image embedding from the text prompt using a prior model, wherein the guidance embedding comprises the image embedding.

8. The method of claim 1, further comprising:
   generating a plurality of guidance embeddings based on the prompt; and
   generating a plurality of synthetic images based on the plurality of guidance embeddings, respectively.

9. The method of claim 1, further comprising:
   providing a diversity input element; and
   receiving the diversity input from a user via the diversity input element.

10. A non-transitory computer-readable medium storing code, the code comprising instructions executable by a processor to:
- obtain a prompt and a diversity input indicating a level of adherence to the prompt;
- generate an expanded prompt based on the prompt;
- embed the prompt and the expanded prompt to obtain a prompt embedding and an expanded prompt embedding, respectively;
- generate a guidance embedding based on the prompt embedding, the expanded prompt embedding, and the diversity input by interpolating between the prompt embedding and the expanded prompt embedding; and
- generate, using an image generation model a synthetic image based on the guidance embedding, wherein the synthetic image depicts an element of the prompt based on the level of adherence from the diversity input.

11. The non-transitory computer-readable medium of claim 10, wherein
- when the diversity input is higher, the guidance embedding closely resembles the expanded prompt embedding, and when the diversity input is lower, the guidance embedding closely resembles the prompt embedding.

12. The non-transitory computer-readable medium of claim 10, the code further comprising instructions executable by the processor to:
- obtain a noise tensor;
- embed the prompt to obtain a prompt embedding; and
- combine the noise tensor and the prompt embedding based on the diversity input to obtain the guidance embedding.

13. The non-transitory computer-readable medium of claim 10, wherein:
- the prompt comprises a text prompt, and the guidance embedding comprises a text embedding.

14. The non-transitory computer-readable medium of claim 10, wherein:
- the prompt comprises an image prompt, and the guidance embedding comprises an image embedding.

15. The non-transitory computer-readable medium of claim 10, wherein:
- the prompt comprises a text prompt, and the guidance embedding comprises an image embedding generated by a prior model based on the text prompt.

16. An apparatus comprising:
- at least one processor;
- at least one memory storing instructions executable by the at least one processor; and
- the apparatus further comprising an image generation model comprising parameters stored in the at least one memory and configured to generate a synthetic image based on a guidance embedding, wherein the guidance embedding is generated based on a prompt, an expanded prompt generated based on the prompt, and a diversity input indicating a level of adherence to the prompt, wherein the apparatus is further configured to embed the prompt and the expanded prompt to obtain a prompt embedding and an expanded prompt embedding, respectively, wherein the guidance embedding is generated by interpolating between the prompt embedding and the expanded prompt embedding, and wherein the synthetic image depicts an element of the prompt based on the level of adherence from the diversity input.

17. The apparatus of claim 16, further comprising:
- a language generation model configured to generate an expanded prompt based on the prompt.

18. The apparatus of claim 16, further comprising:
- a prompt encoder configured to embed the prompt to obtain a prompt embedding.

19. The apparatus of claim 16, further comprising:
- a noise component configured to generate a noise tensor.

20. The apparatus of claim 16, further comprising:
- a user interface configured to display a diversity input element, and to obtain the diversity input from a user via the diversity input element.

* * * * *